Dec. 7, 1937.   E. W. BRASFIELD   2,101,774
REVERSIBLE REDUCTION GEAR
Filed Aug. 15, 1936

Evan W. Brasfield
INVENTOR
BY Victor J. Evans & Co.
ATTORNEYS

Patented Dec. 7, 1937

2,101,774

UNITED STATES PATENT OFFICE 2,101,774

REVERSIBLE REDUCTION GEAR

Evan W. Brasfield, Sheffield, Ala.

Application August 15, 1936, Serial No. 96,259

3 Claims. (Cl. 74—358)

This invention relates to a combined reverse and reduction transmission adaptable for various devices such as boats, elevators, hoists, etc., and has for the primary object the provision of a device of this character which will provide a positive drive in either direction between drive and driven shafts with said shafts arranged in endwise alignment for eliminating bands and such parts heretofore employed in such devices and provides a device wherein the ratio of speed of rotation between said shafts may be as desired by simply selecting and adapting to the device gears of proper sizes.

Another object of the invention is the provision of a brake means for the driven shaft automatically operated by the actuation of the clutch employed for connecting said device to a prime mover whereby upon the disengagement of the clutch the driven shaft will be automatically stopped so that the shifting gears of this device may be readily moved into and out of mesh with other gears for the reversing of operation of the driven shaft by the drive shaft.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a sectional view taken on the line 1—1 of Figure 2 illustrating a combined reversing and reduction transmission constructed in accordance with my invention.

Figure 1:
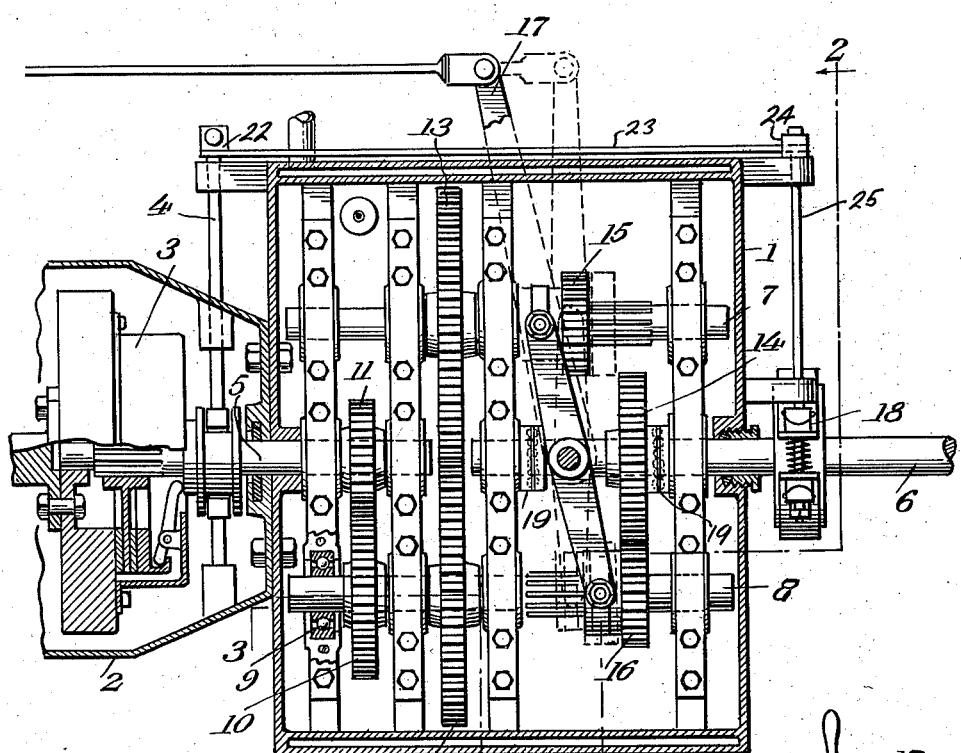
Figure 2:
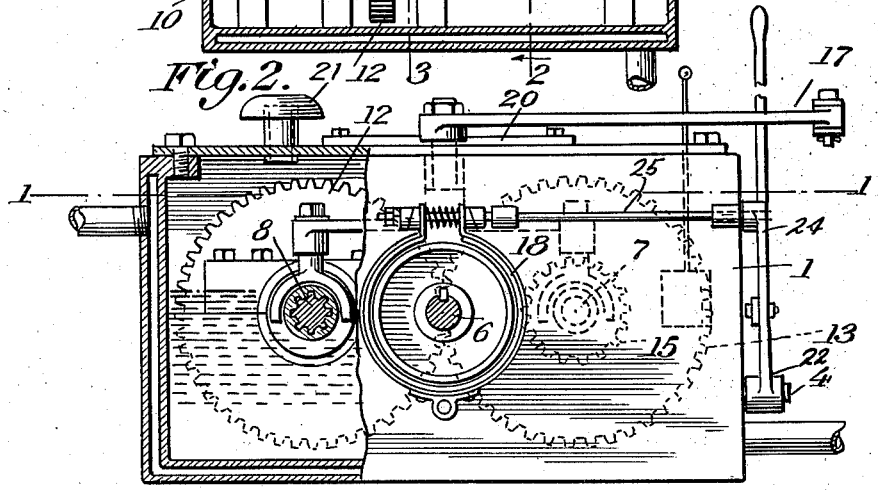
Figure 2 is a sectional view taken on the line 2—2 of Figure 1.
Figure 3:
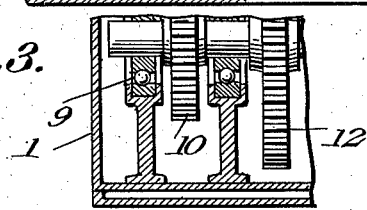
Figure 3 is a detail sectional view taken on the line 3—3 of Figure 1.

Referring in detail to the drawing, the numeral 1 indicates a suitable housing which may be bolted or otherwise secured to a clutch housing 2 forming a part of a prime mover (not shown). Operating in the clutch housing is a clutch 3 of a conventional construction and which is connected to the prime mover and is provided with a control 4 whereby the clutch may be engaged and disengaged when desired. Connected to the clutch and extending into the housing 1 is a drive shaft 5. Also extending into the housing 1 is a driven shaft 6 arranged in endwise alignment with the drive shaft 5. Also located in the housing 1 are countershafts 7 and 8. The shafts 5, 6, 7, and 8 are rotatably supported in the housing 1 by anti-friction bearings 9. The countershaft 8 is connected to the drive shaft 5 by gears 10 and 11. The gear 10 is secured to the countershaft 8 and meshes with the gear 11 and the latter is secured to the drive shaft 5. The countershafts 7 and 8 are connected by gears 12 and 13. The gear 13 is secured to the countershaft 7 and meshes with the gear 12 and the latter is secured to the countershaft 8. Due to the arrangement of the gears 12 and 13 the countershafts 7 and 8 will be driven in opposite directions by the drive shaft 5.

A gear 14 is secured to the driven shaft 6 and splined to the countershafts 7 and 8 are pinions 15 and 16. A control 17 is connected to the pinions 15 and 16 and is of such a construction that the movement thereof will slide the pinions in opposite directions. Through the control 17 the pinion 16 may be made to mesh with the gear 14 for the purpose of rotating the driven shaft 6 in the same direction as the rotation of the drive shaft 5. To drive the driven shaft 6 in a reverse rotation to the drive shaft 5, the pinion 15 is caused to mesh with the gear 14. Thus it will be seen that it is possible to drive the driven shaft 6 in either direction by the drive shaft 5 rotating in one direction. Also it is to be noted that through the arrangement of the gears the speed of rotation of the driven shaft relative to the drive shaft may be varied by changing the size of the gears.

Operating in conjunction with the driven shaft 6 is a brake 18 of any conventional construction and supported by the housing 1 and is operatively connected to the control 4 of the clutch so that when the clutch is disengaged by the actuation of the control 4 the brake will retard and stop the driven shaft 6 so that the pinions may be readily engaged and disengaged with the gear 14.

Suitable thrust bearings 19 are mounted in the housing 1 and are adapted to the driven shaft 6 for the purpose of taking endwise thrust in both directions on said shaft 6. The housing 1 is equipped with a water jacket for the purpose of maintining the lubricant therein and gears and bearings at a desired operating temperature. The housing also is provided with a removable cover 20 and a breather pipe 21.

The clutch operating shaft 4 is connected to the brake 18 by a bell crank 22 having a link 23 secured thereto which is secured at its opposite end to a crank 24 carried by a brake shaft 25.

Having described the invention, I claim:

1. A combined reversing and reduction transmission including a housing and a clutch of a power source, a drive shaft supported by the housing and connected to the clutch, a driven shaft supported by the housing and arranged in endwise alignment with the drive shaft, counter shafts journaled in the housing, means connecting the countershafts, means connecting one of the countershafts to the drive shaft, a gear secured to the driven shaft, pinions slidably secured to the countershafts, and manualy controlled means connected to said pinions for moving said pinions in opposite directions whereby the driven shaft may be rotated in either direction by the rotation of the drive shaft in one direction.

2. A combined reversing and reduction transmission, including a housing and a clutch of a power source, a drive shaft supported by the housing and connected to the clutch, a driven shaft supported by the housing and arranged in endwise alignment with the drive shaft, countershafts journaled in the housing on opposite sides of said driven shaft, means connecting one of the countershafts to the drive shaft, a gear fixed to said driven shaft, gear means connecting the countershafts, pinions slidably secured to the countershafts, lever means connecting said pinions together for movement in opposite directions, and means connected to said lever means for manually rocking said lever means whereby the driven shaft may be rotated in either direction by the rotation of the drive shaft in one direction.

3. A combined reversing and reduction transmission, including a housing, a drive shaft supported by the housing, a driven shaft supported by the housing and arranged in endwise alignment with the drive shaft, countershafts journaled in the housing on opposite sides of said driven shaft, means connecting one of the countershafts to the drive shaft, a gear fixed to said driven shaft, gear means connecting the countershafts, pinions slidably secured to the countershafts and selectively engageable with said gear on said driven shaft, a lever extending between said pinions, means carried by the opposite ends of said lever engageable with said pinions to move said pinions longitudinally of said countershafts for selective engagement with said gear on said driven shaft, a rock shaft carried by said housing engaging said lever intermediate the ends thereof, and operating means secured to said rock shaft.

EVAN W. BRASFIELD.